(No Model.)

T. L. JACKSON & J. REESE.
MACHINE FOR SIFTING SAND.

No. 420,455.  Patented Feb. 4, 1890.

Witnesses:
U. R. Smith.
G. W. Sues.

Inventors:
Theodore L. Jackson and James Reese,
By Thomas G. Orwig, Attorney.

UNITED STATES PATENT OFFICE.

THEODORE L. JACKSON AND JAMES REESE, OF BOONE, IOWA.

MACHINE FOR SIFTING SAND.

SPECIFICATION forming part of Letters Patent No. 420,455, dated February 4, 1890.

Application filed March 29, 1889. Serial No. 305,252. (No model.)

*To all whom it may concern:*

Be it known that we, THEODORE L. JACKSON and JAMES REESE, citizens of the United States of America, and residents of Boone, in the county of Boone and State of Iowa, have invented a new and useful Machine for Sifting Sand, of which the following is a specification.

Heretofore machines for sifting flour, &c., have had sieves attached and reciprocated in various ways.

Our object is to provide a machine specially adapted for operating a sieve of common form for the purpose of facilitating the labor of cleaning sand; and our invention consists in the arrangement and combination of devices, as hereinafter set forth, and pointed out in our claim, and illustrated in the accompanying drawings, in which—

Figure 1:
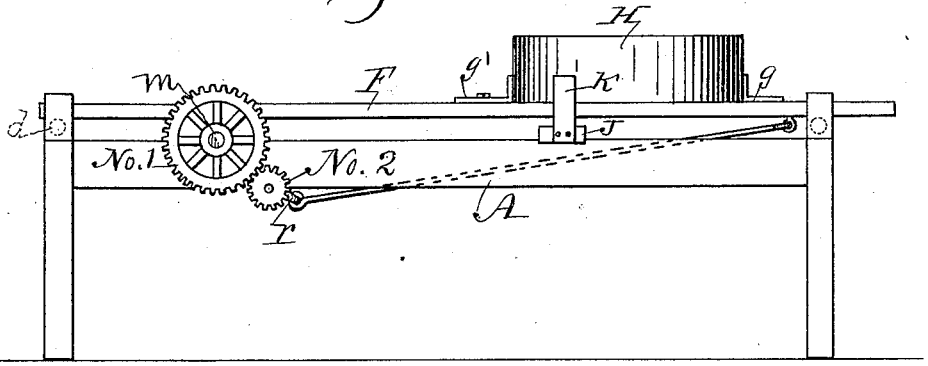
Figure 2:
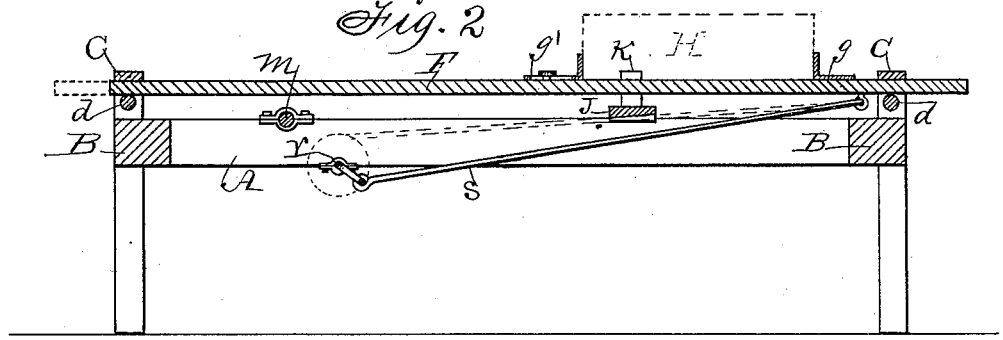
Figure 3:
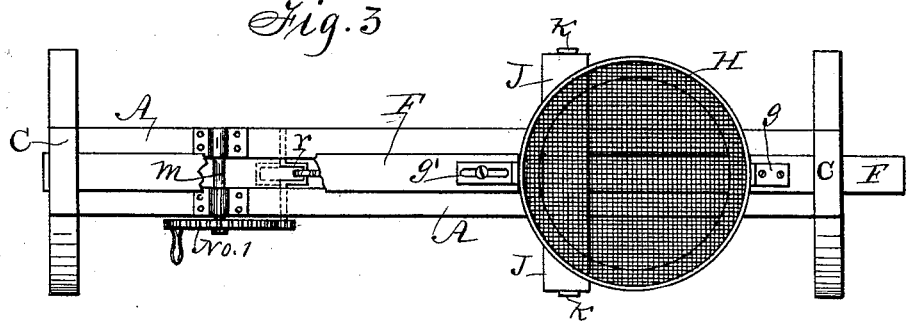

Figure 1 is a side view, Fig. 2 a vertical longitudinal sectional view, and Fig. 3 a top plan view, of our machine.

A are the parallel wooden bars, and B the connecting end pieces of an oblong frame that has legs attached at its corners to support it.

C are auxiliary frames fixed on top of the ends of the horizontal frame to project vertically and to serve as roller-bearers and also as guides for a sieve-carrier.

$d$ are rollers journaled in the uprights of the frames C.

F is a straight bar placed loosely upon the rollers $d$ and under the tops of the frames C in such a manner that it can move longitudinally.

$g$ is an angle-iron fixed on top of the bar F to engage a sieve placed on top of the bar.

$g'$ is a corresponding iron that has a slot, through which a set-screw is passed to adjustably connect the iron with the bar.

H represents a sieve, preferably a round one of common form, placed upon the bar and between the irons $g$ and $g'$, to be detachably fastened thereto, so that it will be carried by the bar.

J is a cross-bar fixed on top of the parallel bars A, and provided with vertical extensions $k$ at its ends in such a manner that the sieve will thereby be prevented from slipping laterally while it is reciprocated with the bar F.

$m$ is a rotating shaft in bearings fixed on top of the bars A. No. 1 is a drive-wheel fixed thereto. $r$ is a crank-shaft in bearings fixed to the under side of the same bars, and No. 2 is a gear-wheel fixed thereto in such a manner that it will engage the drive-wheel.

$s$ is a rod connected with the crank of the shaft $r$ and the sliding bar and sieve-carrier F in such a manner that a rectilinear reciprocating motion will be imparted to the bar whenever the drive-wheel is rotated by means of a crank-handle, or in any other suitable way.

In the practical use of our machine we place sand in the sieve and then rotate the drive-wheel by hand, or by means of a suitable motor connected therewith, to shake the sieve and riddle the sand through, and then lift and empty the sieve of the coarse material retained therein in the same manner that sieves have heretofore been used for sifting and cleaning sand.

We claim as our invention—

A machine for sifting and cleaning sand, comprising a portable stand or oblong frame having supporting-legs at its ends, auxiliary frames and roller-bearers fixed on top of the ends of the main frame, rollers journaled to the vertical parallel side pieces of said auxiliary frames, a straight sliding bar placed upon said rollers, a sieve detachably connected with said bar, a crank-shaft connected with the main frame and with the sliding bar, and a drive-wheel connected with the same frame and the crank-shaft, substantially as shown and described, to operate in the manner set forth.

THEODORE L. JACKSON.
JAMES REESE.

Witnesses:
SAMUEL HAAS,
J. H. SUMLEIN.